Figure 1:
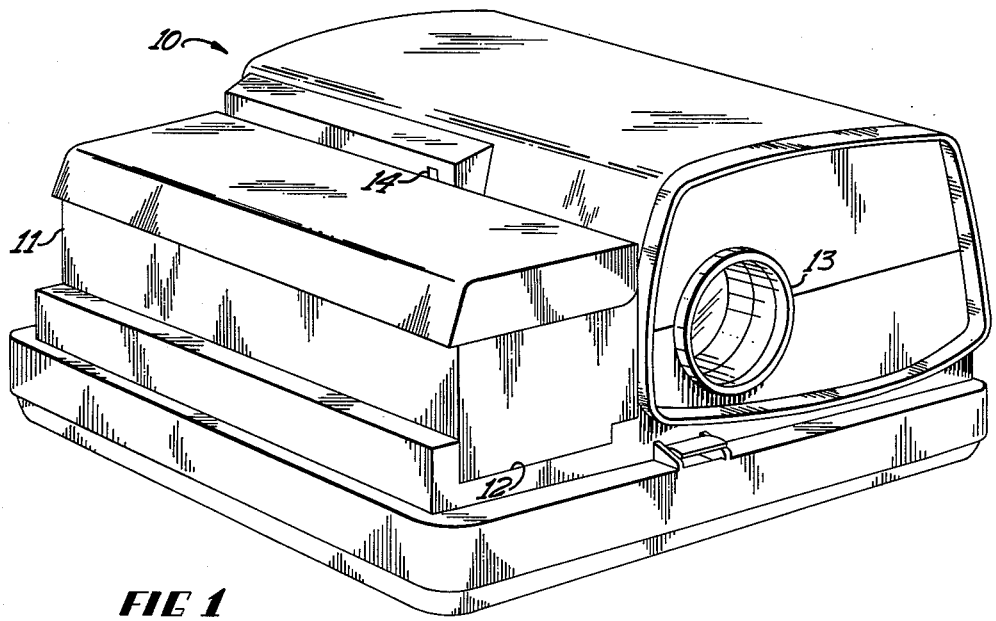

Nov. 23, 1965  J. P. MAHONEY, JR  3,218,922
PHOTOGRAPHIC PROJECTOR WITH JAM LOCK MECHANISM
Filed March 28, 1963  3 Sheets-Sheet 1

INVENTOR.
John P. Mahoney, Jr.
BY
ATTORNEY

Nov. 23, 1965   J. P. MAHONEY, JR   3,218,922
PHOTOGRAPHIC PROJECTOR WITH JAM LOCK MECHANISM
Filed March 28, 1963   3 Sheets-Sheet 2

INVENTOR.
John P. Mahoney, Jr.
BY
Francis A. Sim
ATTORNEY

Nov. 23, 1965  J. P. MAHONEY, JR  3,218,922
PHOTOGRAPHIC PROJECTOR WITH JAM LOCK MECHANISM
Filed March 28, 1963  3 Sheets-Sheet 3

INVENTOR.
John P. Mahoney, Jr.
BY
Francis A. Sirr
ATTORNEY

United States Patent Office 3,218,922
Patented Nov. 23, 1965

3,218,922
PHOTOGRAPHIC PROJECTOR WITH JAM LOCK MECHANISM

John P. Mahoney, Jr., Wheatridge, Colo., assignor to Honeywell Inc., a corporation of Delaware
Filed Mar. 28, 1963, Ser. No. 268,719
8 Claims. (Cl. 88—28)

The present invention is concerned with an improved photographic projector and particularly with a projector having means to lock the slide transfer mechanism in the event that the photographic slide should inadvertently jam within the projector.

Automatic, semi-automatic, and manual photographic projectors, utilizing slide storage trays which store a plurality of individual slides and cooperate with slide changing structure of a projector, have found wide acceptance in the photographic art. The use of such a projector allows the photographer to project a large number of slides to be viewed by an audience, and accomplish this in a convenient manner. Generally speaking, such projectors provide a means which engages one of the slides in the slide storage tray and then moves this slide to a projection compartment within the projector. This slide, while positioned at the projection compartment, is aligned with the optical axis of the projector and is thus projected onto a screen for viewing. After the viewing of this particular slide, the slide is then moved back into the slide storage tray, the slide tray is moved or indexed, and a further slide is moved to the projection compartment of the projector. As will be apparent, should the slide, while being moved, tend to jam and resist such movement, damage to the slide may very likely occur.

The present invention is directed to a construction which prevents undue force being applied to a slide which has jammed.

Specifically, the construction of the present invention provides a mechanism which locks the slide changing mechanism upon a given force being applied to a slide. More particularly, the present invention is concerned with a photographic slide projector of the type having a magnetic member to engage the slide and to pull the slide from the slide storage tray to the projection compartment of the projector by virtue of a magnetic force couple. Should a jam occur during this pulling movement, the magnetic couple is merely broken and no slide damage occurs. However, upon return of this slide to the slide storage tray the magnetic members acts to "push" the slide back into the slide storage tray. The construction of the present invention senses the accumulation of a given force against the slide and locks the slide changing mechanism in the event that this pushing force builds up to the point indicative of a jamming of the slide as it is being returned to the slide storage tray.

As a further feature of the present invention, the return of the slide to the slide storage tray is accomplished by a mechanism having an over travel or a lost motion mounting. Upon the return of the slide to the slide storage tray, a control member continues moving, by virtue of over travel or lost motion, and it is during this continued movement that the slide storage tray is indexed to move a further slide into alignment with a slide receiving window in the side of the projector. The specific construction of the jam sensing mechanism of my invention senses the movement of this over travel or lost motion at a time prior to the time at which a slide is returned to the slide storage tray. Such movement is indicative of a jamming condition of a slide. The construction of my invention then locks the slide changing mechanism to prevent a build up of force against the slide which would tend to damage the slide.

Figure 5:
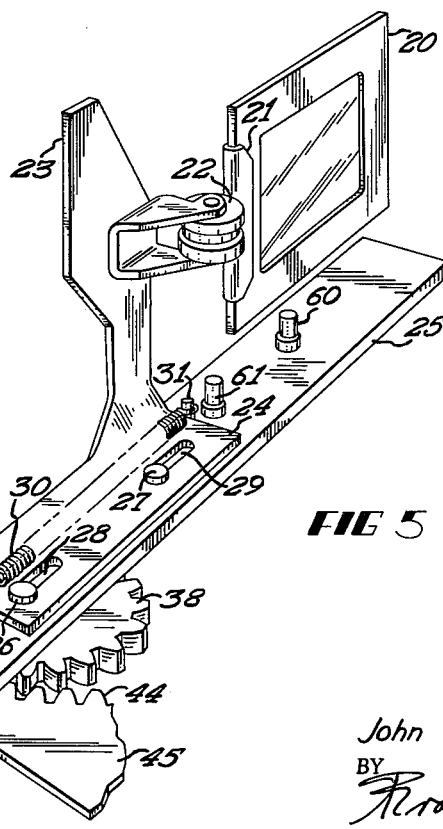
Figure 2:
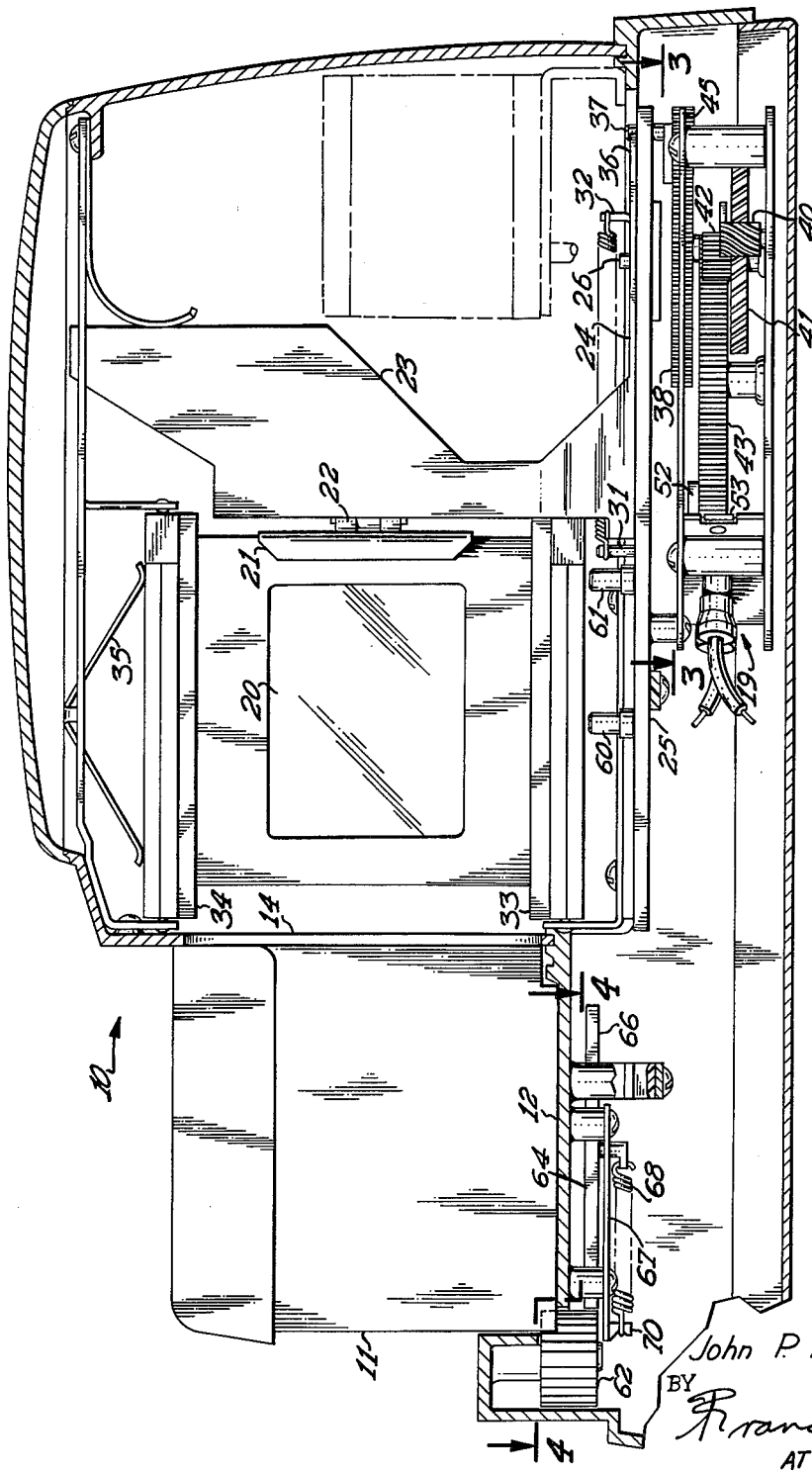
Figure 3:
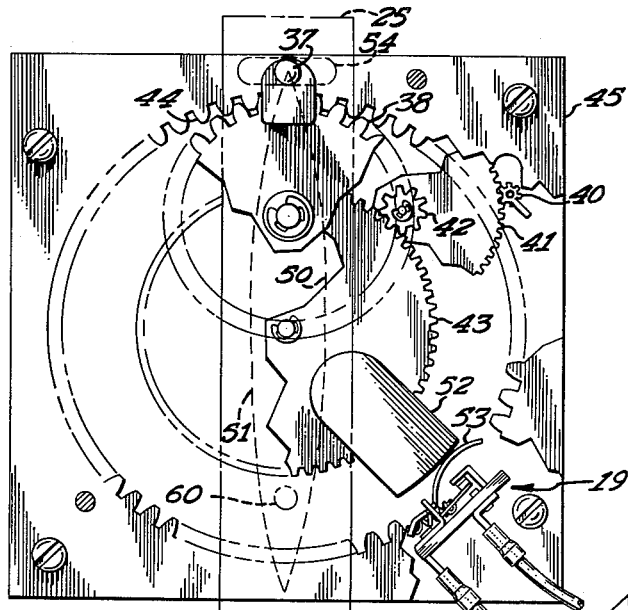
Figure 4:
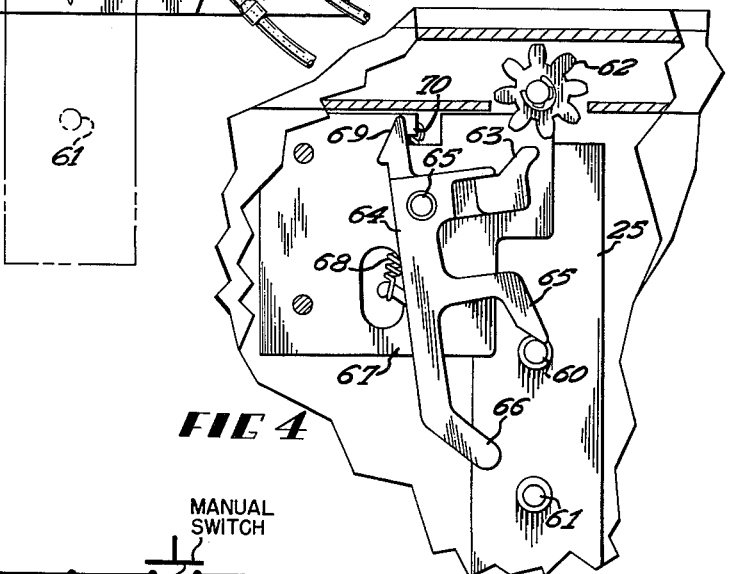
Figure 6:
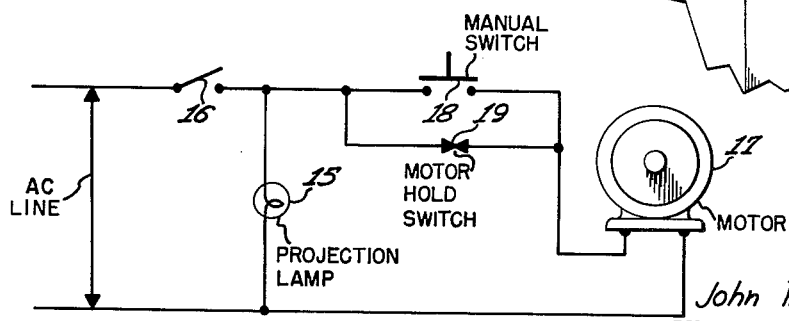

My invention will be apparent to those skilled in the art upon reference to the following specification, claims, and drawings, of which FIGURE 1 is a perspective view of an automatic slide projector, FIGURE 2 is a section view of the projector of FIGURE 1 showing a slide in position at the projection compartment of the projector, showing the slide tray indexing means, showing the slide changing means, and showing the electrical motor and gear mechanism to facilitate changing of the slide and indexing of the slide storage tray, FIGURE 3 is a top view of the gear mechanism of FIGURE 2, showing in phantom a control bar driven by the gear mechanism, and showing by means of a dotted line the path traveled by a drive pin of the gear mechanism, FIGURE 4 is a top view of the slide tray indexing mechanism, showing the drive bar in the position it assumes as a slide has returned to the slide storage tray and as the over travel or loss motion movement is about to take place to index the slide storage tray, FIGURE 5 is a perspective view of the magnetic slide changing structure, showing the engagement of a slide having a magnetic clip, and showing the loss motion or over travel coupling along with a tooth carried thereby to jam the drive pin in the event that the overtravel is taken up prior to the time that the slide is returned to the slide storage tray, and FIGURE 6 is a schematic showing of the electrical portion of the projector in FIGURE 1.

Referring to FIGURE 1, reference numeral 10 designates generally a photographic projector of the automatic type including a slide storage tray 11 mounted on a slide tray receiving platform 12. This slide tray receiving platform defines an elongated channel along which the slide tray is adapted to move, in a step by step fashion, from the back of the projector toward the front. The front of the projector includes an objective lens 13 which is aligned with an optical axis located generally parallel to the slide tray receiving platform. A side wall of the projector includes a slide receiving window 14 through which individual slides from the slide tray 11 are adapted to be moved out of the tray into position at a projection compartment contained within the projector 10, in alignment with the optical axis defined by means including the objective lens 13.

For simplicity, the projection lamp, the condensing lens system and the shutter mechanism, which are also associated with the optical axis of the projector, are not shown. As shown schematically in FIGURE 6, the projection lamp 15 is adapted to be connected across a source of alternating voltage by means of an on-off switch 16. The projector of FIGURE 1 has been simplified and is characterized as an automatic projector having an electric motor 17 under the control of a manual switch 18 and a motor-hold switch 19. As can be seen in FIGURES 2 and 3, the motor-hold switch 19 is associated with a gear mechanism which is driven by electric motor 17. The construction of the switch and the gear mechanism is such that momentary closing of the manual switch 18 causes energization of motor 17 and movement of the gear tray for a small portion of its travel, whereupon motor-hold switch 19 closes to provide a holding circuit for motor 17. As will further be apparent, motor-hold switch 19 is again opened only after the slide then present within the projection compartment of the projector has been moved to the slide storage tray, the slide tray has been indexed, and a further slide has been returned into the projection compartment of the projector to be displayed on the screen.

While the construction of a projector utilizing my invention may take a number of forms, I have chosen, for simplicity, to disclose a projector having a magnetic changing principle and having a lost motion or over travel mechanism to index the slide tray.

Referring to FIGURE 2, reference numeral 20 identifies a slide which is positioned at the projection compartment of the projector. This slide 20, which can also be seen in FIGURE 5, includes a clip 21 to facilitate magnetic coupling of the slide to a magnet 22. Magnet 22 is supported by a vertical arm 23 which is connected to a horizontal plate 24. Plate 24 is mounted by means of an over travel coupling to a control arm 25.

This construction can be seen more clearly in FIGURE 5 where it can be seen that arm 25 carries a pair of pins 26 and 27 which mate with elongated slots 28 and 29, respectively, formed in plate 24. In this manner, relative movement between plate 24 and bar 25 is achieved. A spring 30 has one end connected to a pin 31 secured to bar 25, and has its other end secured to a tab 32 formed as a portion of plate 24. Thus, the construction as viewed in FIGURE 5 is such as allows plate 24 to move generally to the left if a force is exerted on magnet 22, for example, should the slide 20 encounter an obstruction or resist movement back to the slide storage tray 11.

Slide 20 is supported in the projection compartment in a pair of guides 33 and 34 (see FIGURE 2) which are positioned in alignment with the slide receiving window 14 formed in the side of the projector. The upper guide 34 is biased in a downward direction by means of a spring 35 to thus resiliently hold the slide 20 and position the slide 20 accurately in "V" grooves which are formed in the guides 33 and 34 to define a track through which the slide 20 moves.

The locking mechanism of my invention, in the form shown in FIGURE 5, includes a tooth 36 which is formed as an integral portion of plate 24 and is adapted to cooperate with a drive pin 37, drive pin 37 being a portion of the gear train more completely shown in FIGURES 2 and 3. Specifically, drive pin 37 is coupled to and forms an integral portion of the gear 38 of FIGURE 5.

Referring now to the construction of the gear train, as seen in FIGURES 2 and 3, the electrical motor 17 is connected to drive a small pinion gear 40. Pinion gear 40 engages a stationary gear 41 causing rotation of a further pinion gear 42. Pinion gear 42 engages a stationary gear 43 thus causing rotation of this gear. Gear 43 carries the gear 38 at a pivot point located near the periphery of gear 43. Gear 38 engages a ring gear 44 which is formed as an internal gear cut into the plate 45. Thus, energization of motor 17 causes gear 40 to rotate in a clockwise direction as viewed in FIGURE 3. This clockwise rotation produces clockwise rotation of gear 43 to thus carry the pivot point of gear 38 in a clockwise direction. The gear teeth of gear 38 match with the ring gear 44 to cause the drive pin 37 to move in a downward direction following the path defined by the broken line 50 to return a slide to the slide storage tray, to index the slide storage tray, and to then return a slide to the projection compartment of the projector as the drive pin returns to the position shown in FIGURE 3, following the path defined by the broken line 51.

As is apparent from FIGURE 3, a cam 52, supported on the periphery of gear 43, is effective to cooperate with a switch actuating member 53 of motor-hold switch 19 to actuate this switch to a closed condition upon initial movement of gear 43 in a clockwise direction.

As drive pin 37 moves, to follow the path defined by the broken line 50–51 of FIGURE 3, the drive pin moves in an elongated slot 54 formed in drive bar 25. As shown in FIGURE 3, the drive pin 37 occupies a central position within the slot 54. Likewise, as the drive pin completes its travel along the broken line 50 and begins a return along the broken line 51, the drive pin 37 likewise is centered within the slot 54. As the pin drives bar 25, moving along the path defined by reference numeral 50, the pin 37 occupies a right hand position, from center toward the extremity of the slot 54, as seen in FIGURE 3. Along the return movement of path 51, pin 37 occupies positions between the left hand extremity of slot 54 and the center position.

As seen in FIGURE 2, drive bar 25 thus moves from the right hand position to a left hand position. In so moving, magnet 22 pushes against the right hand edge of slide 20 to return this slide to the slide storage tray 14. The construction of the slide projector 10 is so arranged and proportioned that upon slide 20 being returned to the slide storage tray, the magnet 22 and its support 23 encounter an obstruction to limit further movement of the member 22, 23. At this time bar 25 occupies the position generally shown in FIGURE 4.

As shown in FIGURE 4, a pair of drive pins 60 and 61 carried by the bar 25, are now in position to actuate a slide tray indexing mechanism. This slide tray indexing mechanism includes a drive gear 62 which engages a gear rack formed at the lower left hand corner of the slide tray 11, as shown in FIGURE 2. The gear 62 is normally biased by spring or the like, not shown, to be movable in a step fashion by a one-way drive pawl 63 which is pivoted to a drive arm 64. In this manner, drive pawl 63 engages a gear tooth of gear 62 as arm 64 pivots in a counter clockwise direction about a pivot point 65. The return clockwise movement of arm 64 is accompanied by rotation of drive pawl 63 on arm 64, in a counter clockwise direction, to allow the drive pawl 63 to pass by the gear surfaces of gear 62 without moving the gear.

Defining arm 64 in greater detail, this arm includes first and second actuating arms 65 and 66. These arms cooperate with the drive pins 60 and 61 respectively. Arm 64 is mounted to a plate 67, at pivot 65, and is biased for clockwise rotation about pivot 65 by means of a spring 68. The extent of its clockwise rotation is limited by a portion 69 engaging a stop 70 formed in plate 67.

As mentioned above, the control arm 25, as seen in FIGURE 4, is in the position it assumes as the slide 20 of FIGURE 2 has just been returned to the slide storage tray 11. The drive pin 37 (see FIGURE 3) has not fully completed its travel along the path 50. The further travel along this path is effective to cause the drive pins 60 and 61 carried by bar 25 (see FIGURE 4) to move in an upward direction causing rotation of arm 64 in a counter clockwise direction about its pivot 65 and causing drive pawl 63 to engage an adjacent gear face of gear 62. Thus, gear 62 is moved a distance equal to the spacing of adjacent gear teeth to index slide tray 11, moving it in a forward direction as seen in FIGURE 1, thus moving an adjacent slide into alignment with the slide receiving window 14 formed in the side of the projector.

As the control bar 25 moves through the lost motion connection, plate 24 (see FIGURE 5) remains stationary, pins 26 and 27 moving in the elongated slot 54 formed in plate 24. The drive pin 37 is now approximately centered within the slot 54 and thus there is no engagement of the locking tooth 36 carried by the plate 24 and the drive pin 37.

As the electric motor 17 continues to rotate, drive pin 37 begins to move along the path defined by the broken line 51 of FIGURE 3, returning to the position shown in FIGURE 3. As the drive pin 37 progresses along the path 51, the lost motion is first taken up to restore the parts to the position shown in FIGURE 5. Further movement of the bar 25 then causes a new slide to be pulled out of the slide tray 11 and to be guided along the guides 33 and 34 to be positioned at the optical axis of the projector.

Return movement of control bar 25, and the return movement of drive pins 60 and 61 (see FIGURE 4) carried by this control bar is effective to engage indexing arm 64 and to return this arm to the position shown in FIGURE 4, allowing this arm to rotate in a clockwise direction under the bias of spring 68. As above mentioned, drive pawl 63 is a one way drive pawl which is pivoted on arm 64. This pawl rotates in a counter clockwise direction as it passes by the gear teeth in gear 62.

As the electric motor 17 continues to rotate to ultimately position the new slide at the optical axis of the projector, the cam surface 52 carried by gear 43 again approaches the position shown in FIGURE 3, until the switch 19 is actuated to an open position. The new slide is then displayed on the screen.

Thus far, I have described a normal sequence of operation of the apparatus disclosed.

If it is now assumed that the movement of a slide from the slide storage tray toward the projection compartment within the projector is accompanied by a jamming of the slide, the magnetic couple between magnet 22 and slide clip 21 is broken, and the members 22–23 continue to the projection compartment, leaving the slide at the position where it jammed. As such, no damage occurs to the slide.

If it is assumed that the jam of the slide occurs as the magnet 22 pushes against the slide to return it from the projection position shown in FIGURE 2 back to the slide tray 11, then the locking tooth 36 of plate 24 operates to jam the drive pin 37 and prevent undue force being applied to the side of the slide.

For example, assume that the slide 20, as disclosed in FIGURE 2, has partially entered the slide tray 11 and then has encountered an obstruction. The drive pin 37 (see FIGURE 3) now is positioned somewhere along the path identified by the broken line 50, and is not at the lower terminal portion of this path. The resistance encountered by the slide is effective to stop the magnet 22 and its support member 23. Continued movement of the control bar 25, as driven by motor 17 and the gear train, is effective to cause the over travel mechanism 28–29 to be taken up and to thus move the locking tooth 36 back toward the drive pin 37 (see FIGURE 5). Since drive pin 37 is now located toward the right hand extremity of the notch 54 as seen in FIGURE 3, and toward the left hand extremity of this notch as seen in FIGURE 5, the locking tooth 36 engages the drive pin 37 and prevents further movement of the drive pin toward that end of the notch 54. As a result, the movement of the control bar 25 and of the individual gears of the gear train is stopped. The entire mechanism is now stalled or jammed with the force exerted by magnet 22 against the clip 21 of the slide being that force which has been built up in the spring 30 of the lost motion mechanism.

It will be noted that while the mechanism is jammed to prevent damage to the slide, the motor 17 continues to be energized. However, a slip clutch may be provided in the coupling between motor 17 and pinion 40 to accommodate the continued energization of the motor.

From the above description it can be seen that I have provided an improved photographic projector having a safety means in the form of a jamming means which is operative to interrupt operation of the slide changing means in the event that a slide jam occurs.

Other modifications of my invention will be apparent to those skilled in the art, and it is thus intended that the scope of my invention be limited wholly to the scope of the appended claims.

I claim as my invention:

1. In a photographic projector of the type utilizing a slide storage tray holding a plurality of individual slides adapted to be moved one at a time to a projection compartment and to be displayed on a screen or the like,
   slide changing means including lost motion means effective to move the slides between the tray and the projection compartment,
   slide tray indexing means effective to move the tray in step by step fashion,
   means controlled by said slide changing means, by virtue of said lost motion means to actuate said slide tray indexing means and move the tray when a slide has been returned thereto,
   and safety means operative to interrupt operation of said slide changing means in the event that said lost motion means is actuated at a time other than when a slide has been returned to the tray.

2. In a photographic projector,
   slide changing means,
   slide engaging means adapted to engage a photographic slide and to move the same to a projection position where the slide may be projected on a screen or the like,
   lost motion means,
   means including said lost motion means mounting said slide engaging means to said slide changing means,
   and safety means operative to interrupt operation of said slide changing means in the event that said lost motion means is actuated by a jam of the slide within said projector.

3. In combination, a photographic projector having a slide tray platform adapted to receive a slide storage tray holding a plurality of individual photographic slides,
   slide engaging means adapted to engage a one of the slides in the slide storage tray,
   movable control means operable to selectively control the changing of the slide to be displayed by the projector,
   lost motion means mounting said slide engaging means to said control means, and actuated by the jamming of a slide as it is being moved by movement of said control means,
   and jam lock means controlled by said actuation of said lost motion means to prevent further movement of said control means.

4. In combination, a photographic projector having a slide tray platform adapted to receive a slide storage tray holding a plurality of individual photographic slides,
   slide tray indexing means adapted to move the slide tray in step by step fashion,
   slide engaging means adapted to engage a one of the slides in the slide storage tray,
   movable control means operable to selectively control the changing of the slide to be displayed by the projector,
   lost motion means mounting said slide engaging means to said control means, and actuated by the jamming of a slide as it is being moved by movement of said control means,
   said lost motion means being effective when a slide has been returned to the slide storage tray to allow further movement of said control means to actuate said slide tray indexing means to move a further slide into cooperative relation with said slide engaging means,
   and jam lock means controlled by said actuation of said lost motion means to prevent further movement of said control means.

5. In a photographic slide projector, an electric motor,
   a drive mechanism including a drive pin movable in a generally circular path to complete one revolution of said path for a cycle of operation of said drive mechanism,
   means coupling said electric motor to said drive mechanism,
   slide changing circuit means operable to effect energization of said electric motor to produce a cycle of operation of said drive mechanism,
   a movable control member having an elongated open slot mating with said drive pin, said control member thereby being driven in a linear fashion to reciprocate between a projection position and a slide changing position during said cycle of operation,
   slide engaging means including jam lock means, lost motion means mounting said slide engaging means to said control member to thereby move a slide between a projection position within the projector, to a slide changing position, and to then return a slide to the projection position during said cycle of operation, and means, including said jam lock means, effective to jam said drive pin in said open slot to prevent further movement of said control member in the event that said lost motion means is actuated as a slide moves between the projection position and the slide changing position, to thereby prevent damage to the slide as a result of such a jam.

6. In a photographic slide projector having a slide storage tray, an electric motor, a drive mechanism including a drive pin movable in a generally circular path to complete one revolution of said path for a cycle of operation of said drive mechanism, means coupling said electric motor to said drive mechanism, slide changing circuit means operable to effect energization of said electric motor to produce a cycle of operation of said drive mechanism, to thereby sequentially return a slide to the tray, index the tray, and return a slide to a projection position, a movable control member having an elongated open slot mating with said drive pin, said control member thereby being driven in a linear fashion to reciprocate between a projection position and a slide changing position during said cycle of operation, slide engaging means including a jam lock tooth, lost motion means mounting said slide engaging means to said control member to thereby move a slide between a projection position within the projector, to a slide changing position, and to then return a slide to the projection position during said cycle of operation, slide tray indexing means to move said slide storage tray in step by step fashion, means including said control member as it moves at the slide changing position to actuate said lost motion means and to actuate said slide tray indexing means preparatory returning a slide from the tray to the projection position, and jam lock means, including said jam lock tooth, effective to jam said drive pin in said open slot to prevent further movement of said control member in the event that said lost motion means is actuated as a slide moves between the projection position and the slide changing position, to thereby prevent damage to the slide as a result of such a jam.

7. In a photographic projector of the type utilizing a slide storage tray holding a plurality of individual slides adapted to be moved, one at a time, to a projection compartment and to be displaced on a screen or the like, slide changing means including a movable control bar and a magnet mounted thereon by means including lost motion means, slide tray indexing means effective when actuated to move the tray in a step by step fashion, means operable to move said control bar toward the tray to push a slide from the projection compartment to the tray, to actuate said slide tray indexing means and thus move the tray after the slide has been returned to the tray as said control bar continues to move by virtue of said lost motion means, and to pull a further slide to the projection compartment by virtue of a magnetic couple thereto, and safety means operative to interrupt operation of said slide changing means in the event that said lost motion means is actuated when a slide is being returned to the tray.

8. A photographic slide projector comprising slide changing means to move a slide between storage and projection positions and including slide engaging means, movable control means, lost motion means coupling said slide engaging means to said control means and actuated by the jamming of a slide as the latter is being moved by said slide changing means, and operating means coupled to said control means to move the latter to effect said movement of said slide, and jam lock means controlled by said actuation of said lost motion means to lock and prevent the further movement of said control means upon said actuation.

References Cited by the Examiner
UNITED STATES PATENTS
3,053,146  9/1962  King _____ 88—28

NORTON ANSHER, *Primary Examiner.*
WILLIAM MISIEK, *Examiner.*